Patented Aug. 16, 1949

2,479,418

UNITED STATES PATENT OFFICE 2,479,418

OLEFIN DIMERS AS PROMOTERS IN LOW-TEMPERATURE FRIEDEL-CRAFTS POLYMERIZATION

Henry G. Schutze, Goose Creek, Tex., assignor, by mesne assignments, to Standard Oil Development Company, Elizabeth, N. J., a corporation of Delaware No Drawing. Application June 22, 1946,
Serial No. 678,689

6 Claims. (Cl. 260—85.3)

The present invention is directed to an improved process for the polymerization of olefins in the presence of a Friedel-Crafts type catalyst. More particularly, the invention is directed to the low temperature polymerization of olefinic mixtures in the presence of Friedel-Crafts type catalyst and a promoter for the reaction.

Prior to the present invention it has been customary to polymerize tertiary olefins, such as isobutylene and diolefins, such as butadiene or isoprene, at low temperatures of the order of $-50°$ F. to $-175°$ F. to obtain a product which is suitable for vulcanization. The process is extremely sensitive to impurities and it is necessary that expensive expedients be resorted to in order to obtain purified reactants. The nature of the impurities which are removed from the reactants comprise acidic material, unsaturated polymers of relatively low molecular weight, oxygenated bodies and various other extraneous materials which may find their way into the system in which the polymerization is effected. The purification steps comprise various chemical and physical treating methods to obtain the purified product.

It is desirable also to remove water from the olefins since water in appreciable quantities will hydrate the Friedel-Crafts type catalyst and render it less efficient than if the reactants are in an anhydrous condition.

The nature of the impurities has made it difficult to obtain the reactant hydrocarbons in substantially pure condition. From time to time it has, therefore, been necessary, in order to obtain best results, to increase the concentration of the Friedel-Crafts type catalyst which is employed. Ordinarily, the catalyst is employed in a solution of an organic halide in a concentration of about 0.1 to 0.5 gram of aluminum chloride per 100 c. c. of solvent. The usual solvent employed is an alkyl halide, such as methyl chloride. In order to maintain the efficiency of the catalyst, at times it has been necessary to increase the concentration of aluminum chloride to the upper limit given which may make for an unsatisfactory reaction in view of the extremely active nature of these concentrations of catalyst solution.

In accordance with the present invention, the polymerization of olefins in the presence of a Friedel-Crafts type of catalyst at low temperatures is improved by the addition to the reaction mixture of controlled amounts of an unsaturated polymer having 6 to 8 carbon atoms in the molecule. It has been discovered that, contrary to the prior art teachings, di-isobutylene in the reaction mixture in an amount between about 14 and 136 parts per million promotes the reaction and activates the catalyst to a degree that solutions of low catalyst concentration may be employed.

In the preferred practice of the present invention, both the fresh feed of olefinic stock and the catalyst are thoroughly dehydrated. A controlled amount of di-isobutylene or other low molecular weight unsaturated polymer is then added either to the stream of fresh feed or to the stream of catalyst or to both streams. The fresh feed and catalyst streams are next separately chilled to the desired low temperature and discharged into a vessel provided with a mixing means. The components to the reaction are mixed as rapidly as possible and then allowed to remain in contact for a predetermined period of time. After the reaction has proceeded a sufficient period of time for the formation of the desired polymer, it is terminated by suitable means, such as by adding water to the reaction mixture, and the polymer is then separated as the desired product.

The operation described above is generally applicable to the polymerization of olefins in the presence of a Friedel-Crafts type catalyst. Of particular interest at the present time is the employment of this type of reaction to form vulcanizable gums by the polymerization of isobutylene, a mono-olefin, in the presence of a small amount of diolefin, such as butadiene or isoprene. Suitable Friedel-Crafts type catalysts for promoting this polymerization are aluminum chloride, aluminum bromide and boron trifluoride. The polymerization reaction must be carried out at relatively low temperatures with a preferred range of $-100°$ to $-175°$ F. A catalyst may suitably be prepared by agitating dehydrated methyl chloride with powdered aluminum chloride at a temperature of about $-20°$ F. to give a solution of a concentration of about 0.1 to 0.5 gram of $AlCl_3$ per 100 c. c. of methyl chloride. A hydrocarbon feed stock comprising isobutylene having admixed therein from 2 to 20% of isoprene may be dehydrated by passing it over a bed of calcium chloride or other suitable dehydrating agent. The hydrocarbon feed stock containing the unsaturated polymer is then chilled to about −140° F. and passed into a vessel. The solution of aluminum chloride in methyl chloride is chilled to a temperature slightly above the freezing point of methyl chloride, say, −120° F., and the catalyst sprayed into the vessel through a nozzle while the diolefin-monoolefin mixture in the vessel is being violently agitated. From 10 to 20 volume per cent of catalyst solution may be employed which may be added over a period ranging from about ten seconds to ten minutes. After the reactants have been in contact the desired interval of time, the reaction may be terminated by the addition of a large excess of water or alcohol to the vessel. The polymer is then recovered and carefully washed to remove the catalyst after which the polymer may be dried and compounded as is desired. In the quenching step, the catalyst is intentionally destroyed in order to prevent further action beyond the desired polymerization. This quenching step can be effected by any hydrolyzing agent such as alcohol or water, but it is preferred to use hot water.

Although the foregoing describes a batch polymerization process, it is understood that the process may be made to operate on a continuous basis by constantly adding fresh feed and catalyst to the agitated reaction mixture and constantly removing the product as a slurry along with unconverted feed and methyl chloride.

The invention will be further illustrated by the following examples in which isobutylene and isoprene diluted with methyl chloride were polymerized in a batch reactor. The methyl chloride was purified by treatment with phosphoric anhydride. A catalyst solution containing aluminum chloride in an amount of 0.070 gram of aluminum chloride per 100 c. c. of solution was employed. To a chilled reactor was introduced a measured amount of a precooled feed comprising isobutylene, isoprene and methyl chloride. The feed contained 25% isobutylene and a small amount of isoprene, amounting to 2.5% of the isobutylene. The feed stock was charged to a cold reactor which had been dried, purged and blanketed with nitrogen. A stirring mechanism was attached and a means was provided for injection of catalyst solution. The feed stock was cooled to −145° F. and injection of catalyst solution was started and maintained at a constant rate of 17 ml./minute. After the desired amount of catalyst had been added the reactant mass, which was in the form of a slurry, was agitated for an additional two minutes and the reaction stopped by addition of alcohol. The reacted material was then further quenched by the addition of hot water. The rubbery material was kneaded in the presence of hot water until a crumbly body was formed. The crumbs of polymer were strained and squeezed to remove as much entrained water as possible until the water content was in the range of 20%. The weight of the polymer was recorded and corrected for the amount of water remaining in the polymer mass. From the data obtained on the weight of polymer produced, the catalyst efficiency, conversion and the aluminum chloride polymer relationships were calculated.

Runs in accordance with the foregoing procedure were conducted without addition of di-isobutylene and with addition of di-isobutylene in the amount of 14 to 136 parts per million. Comparative runs similar in every respect were made using a 60-minute contact time, as well as a two-minute contact time. The data obtained from these runs are recorded in the following table:

Table

| Catalyst Efficiency, Lb. polymer/ Lb. AlCl₃ | Conv., Percent Based on Total Olefins | Polymer Produced, Grams | Dimer[1] Added to Feed, P. P. M. | Mooney Vis. | Mol. Wt. |
|---|---|---|---|---|---|
| CONTACT TIME—2 MINUTES ||||||
| 2,035 | 46.5 | 119 | [2] 14 | 68 | 67,275 |
| 2,220 | 50.8 | 130 | 34 | 73 | 71,850 |
| 2,360 | 53.5 | 137 | 69 | 73 | 70,000 |
| 2,460 | 56.3 | 144 | 102 | | |
| 2,530 | 57.8 | 148 | 136 | | |
| CONTACT TIME—60 MINUTES ||||||
| 3,500 | 80.1 | 205 | [3] 14 | | |
| 3,570 | 81.6 | 209 | 34 | | |
| 3,800 | 86.7 | 222 | 69 | | |
| 3,730 | 85.1 | 218 | 102 | | |
| 3,520 | 80.5 | 206 | 136 | | |

[1] 100°–101° C. fraction of crude polymer (substantially di-isobutylene).
[2] Polymer produced in two minutes contact time without dimer—110 grams.
[3] Polymer produced in sixty minutes contact time without dimer—180 grams.

It will be seen from the foregoing data that the amount of polymer produced is greatly increased by the addition of di-isobutylene to the reactants. Whereas, with the 2-minute contact time only 110 grams of polymer were produced, when di-isobutylene was present the amount of polymer was increased to 119–148 grams. At the longer contact time, the amount of polymer was increased from 180 grams to between 205 and 222 grams. It is significant that, at the lower limit and the upper limit of the critical range of promoter concentration, there is no great increase in polymer production. The optimum figure appears to be in the range of about 70 P. P. M. of di-isobutylene in the feed stock. Of great significance in the addition of di-isobutylene to the hydrocarbons being polymerized is the absence of effect on the Mooney viscosity and molecular weight of the product. It will be noted that the Mooney viscosity remained fairly constant in the runs with two-minute contact time, while the molecular weight was raised only slightly. It is believed that the variations may be due to experimental error in the testing technique.

While the present invention has been described with relation to the employment of di-isobutylene as the promoter for the reaction, it is to be understood that other unsaturated polymers may be used. For example, the dimer of propylene may be employed in lieu of the dimer of isobutylene.

The nature and objects of the present invention having been thus described and illustrated, what is claimed as new and useful and is desired to be secured by Letters Patent is:

1. A process for polymerizing a mixture of anhydrous isobutylene, a diolefin having 4 to 5 carbon atoms and an alkyl halide, said mixture containing approximately 25% isobutylene, 0.5% diolefin, and the remainder alkyl halide at a temperature between −50° and −175° F. which comprises the steps of maintaining said mixture in the presence of a Friedel-Crafts catalyst at a temperature in the range between −50° and −175° F. in the presence of between 14 and 136 parts per million based on said mixture of an unsaturated mono-olefin dimer having 6 to 8 carbon atoms for a sufficient interval of time to form a polymer, and recovering said polymer.

2. A method for producing a rubbery polymer which includes the steps of chilling a mixture of 25% isobutylene, approximately 0.5% isoprene and the remainder methyl chloride to a temperature in the range of −50° to −175° F., maintaining in the mixture a concentration of an unsaturated mono-olefin dimer having 6 to 8 carbon atoms between 14 and 136 parts per million in the hydrocarbons being reacted while adding a Friedel-Crafts catalyst thereto, stopping said reaction after a polymer has formed, and recovering said polymer.

3. A method in accordance with claim 2 in which the unsaturated polymer having 6 to 8 carbon atoms in di-isobutylene.

4. A process for producing a rubbery polymer which includes the steps of forming a dehydrated feed stock comprising isobutylene, methyl chloride and isoprene, chilling the mixture to a polymerization temperature in the range of −50° to −175° F., chilling a solution of a dry Friedel-Crafts catalyst to substantially the same temperature, admixing said Friedel-Crafts type catalyst with said chilled mixture at said low temperatures and maintaining in the body of the Friedel-Crafts catalyst and chilled hydrocarbon mixture a concentration of an unsaturated mono-olefin dimer having 6 to 8 carbon atoms in an amount between 14 and 136 parts per million based on the feed stock for a sufficient interval of time to polymerize said hydrocarbon feed mixture, adding to the reactants a material which reacts with the Friedel-Crafts type catalyst, and recovering rubbery polymer formed in the reaction.

5. A method in accordance with claim 4 wherein the catalyst solution comprises aluminum chloride and the unsaturated polymer is di-isobutylene.

6. A process for polymerizing a mixture of substantially moisture-free olefin which comprises the steps of admixing moisture-free isobutylene, Friedel-Crafts catalyst and unsaturated mono-olefin dimer having 6 to 8 carbon atoms in a range of 14 and 136 parts per million based on the feed mixture at a low temperature in the range between −50° and −175° F. to polymerize said isobutylene.

HENRY G. SCHUTZE.

REFERENCES CITED

The following references are of record in the file of this patent:

UNITED STATES PATENTS

| Number | Name | Date |
|---|---|---|
| 1,910,846 | Maximoff | May 23, 1933 |
| 2,322,073 | Thomas | June 15, 1943 |